(12) United States Patent
Kim et al.

(10) Patent No.: US 8,871,388 B2
(45) Date of Patent: Oct. 28, 2014

(54) NEGATIVE ELECTRODE FOR LITHIUM BATTERY AND LITHIUM BATTERY INCLUDING NEGATIVE ELECTRODE

(75) Inventors: Beom-Kwon Kim, Yongin-Si (KR); Jae-Myung Kim, Yongin-Si (KR); Kyu-Nam Joo, Yongin-Si (KR); Jong-Hee Lee, Yongin-Si (KR); So-Ra Lee, Yongin-Si (KR); Young-Su Kim, Yongin-Si (KR); Deok-Hyun Kim, Yongin-Si (KR); Gu-Hyun Chung, Yongin-Si (KR)

(73) Assignee: Samsung SDI Co., Ltd. (KR)

( * ) Notice: Subject to any disclaimer, the term of this patent is extended or adjusted under 35 U.S.C. 154(b) by 551 days.

(21) Appl. No.: 12/952,096

(22) Filed: Nov. 22, 2010

(65) Prior Publication Data

US 2011/0129733 A1  Jun. 2, 2011

(30) Foreign Application Priority Data

Nov. 27, 2009  (KR) .................. 10-2009-0115920

(51) Int. Cl.
| | |
|---|---|
| *H01M 4/52* | (2010.01) |
| *H01M 4/42* | (2006.01) |
| *H01M 10/052* | (2010.01) |
| *H01M 4/133* | (2010.01) |
| *H01M 4/134* | (2010.01) |
| *H01M 4/38* | (2006.01) |
| *H01M 4/587* | (2010.01) |
| *H01M 4/1395* | (2010.01) |
| *H01M 4/1393* | (2010.01) |

(52) U.S. Cl.
CPC ............. *H01M 4/587* (2013.01); *H01M 4/42* (2013.01); *H01M 10/052* (2013.01); *Y02E 60/122* (2013.01); *H01M 4/133* (2013.01); *H01M 4/134* (2013.01); *H01M 4/38* (2013.01); *H01M 4/1395* (2013.01); *H01M 4/1393* (2013.01)
USPC ........................................ 429/221; 429/223

(58) Field of Classification Search
USPC ........... 429/218.1, 220, 229, 251.5, 221, 223, 429/224, 231.8; 427/123
See application file for complete search history.

(56) References Cited

U.S. PATENT DOCUMENTS

| | | | |
|---|---|---|---|
| 6,440,610 B1 | 8/2002 | Sheem et al. | |
| 2003/0044682 A1* | 3/2003 | Park et al. | ........ 429/223 |
| 2007/0122702 A1* | 5/2007 | Sung et al. | ...... 429/218.1 |
| 2008/0020282 A1 | 1/2008 | Kim et al. | |
| 2008/0160409 A1 | 7/2008 | Ishida et al. | |
| 2009/0176151 A1 | 7/2009 | Kim | |
| 2011/0195311 A1* | 8/2011 | Kim et al. | ........ 429/231.8 |

FOREIGN PATENT DOCUMENTS

| | | |
|---|---|---|
| JP | 2002-373647 | 12/2002 |
| JP | 2007-231414 | 9/2007 |

(Continued)

OTHER PUBLICATIONS

Notice of Allowance dated May 20, 2012 of corresponding Korean Patent Application No. 10-2009-0115920—5 pages.

*Primary Examiner* — Mark F Huff
*Assistant Examiner* — Monique Wills
(74) *Attorney, Agent, or Firm* — Knobbe, Martens, Olson & Bear LLP

(57) ABSTRACT

A negative electrode for a lithium battery and a lithium battery including the negative electrode, the negative electrode including: a matrix of a Sn grain and a metal M grain; and a carbon-based material grown on the matrix.

4 Claims, 6 Drawing Sheets

(56) References Cited

FOREIGN PATENT DOCUMENTS

| KR | 10-0350535 | B1 | 8/2002 |
|---|---|---|---|
| KR | 10-2007-0026699 | A | 3/2007 |
| KR | 10-2007-0051667 | A | 5/2007 |
| KR | 10-2008-0076291 | A | 8/2008 |
| KR | 10-2008-0111809 | A | 12/2008 |
| KR | 10-2009-0053192 | A | 5/2009 |
| KR | 10-2009-0076283 | A | 7/2009 |

* cited by examiner

NEGATIVE ELECTRODE FOR LITHIUM BATTERY AND LITHIUM BATTERY INCLUDING NEGATIVE ELECTRODE

CROSS-REFERENCE TO RELATED APPLICATION

This application claims the benefit of Korean Patent Application No. 10-2009-0115920, filed on Nov. 27, 2009, in the Korean Intellectual Property Office, the disclosure of which is incorporated herein by reference.

BACKGROUND

1. Field

One or more embodiments of the present invention relate to a negative electrode and a lithium battery including the negative electrode.

2. Description of the Related Art

Recently, lithium batteries have attracted attention as power sources of portable electronic devices. Lithium batteries include an organic electrolyte and have a discharge voltage that is two times or greater than that general alkali batteries and thus, have a higher energy density.

As positive active materials for lithium batteries, lithium-transition metal oxides, such as $LiCoO_2$, which have a structure that allows for the reversible intercalation of lithium ions, are mainly used. Carbonaceous materials in various forms, such as artificial graphite, natural graphite, and hard carbon, which allow the reversible intercalation of lithium ions, have been used as negative active materials. However, these carbonaceous materials can result in poor stability and reduced capacity. Thus, non-carbonaceous materials, such as silicon (Si), are under research as negative active materials. Such non-carbonaceous materials exhibit a higher density, as compared to graphite, and thus, have a very high capacity. However, the cycle life characteristics thereof may deteriorate, due to volumetric changes thereof that occur during charging and discharging.

SUMMARY

One or more embodiments of the present invention include a negative electrode for a lithium battery having improved capacity properties and cycle-life.

One or more embodiments of the present invention include a method of manufacturing the negative electrode.

One or more embodiments of the present invention include a lithium battery including the negative electrode.

According to one or more embodiments of the present invention, a negative electrode for a lithium battery includes a current collector and a negative active material layer. The negative active material layer includes: a matrix including an M-Sn alloy grain and a Sn grain; and a carbon-based material grown directly on the matrix, wherein M is a metal that is not alloyed with lithium.

According to one or more embodiments of the present invention, a method of manufacturing a negative electrode for a lithium battery includes: forming a plating layer including a metal M that is not alloyed with lithium and Sn; and converting the plating layer into a matrix including a M-Sn alloy grain and a Sn grain, on a current collector, while simultaneously growing a carbon-based material directly on the matrix, to form a negative active material layer. The carbon-based material is grown by providing a carbon source onto the plating layer, under a high temperature atmosphere.

According to one or more embodiments of the present invention, a lithium battery includes: a positive electrode including a positive active material; a negative electrode including the above-described negative active material layer; and an electrolyte.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
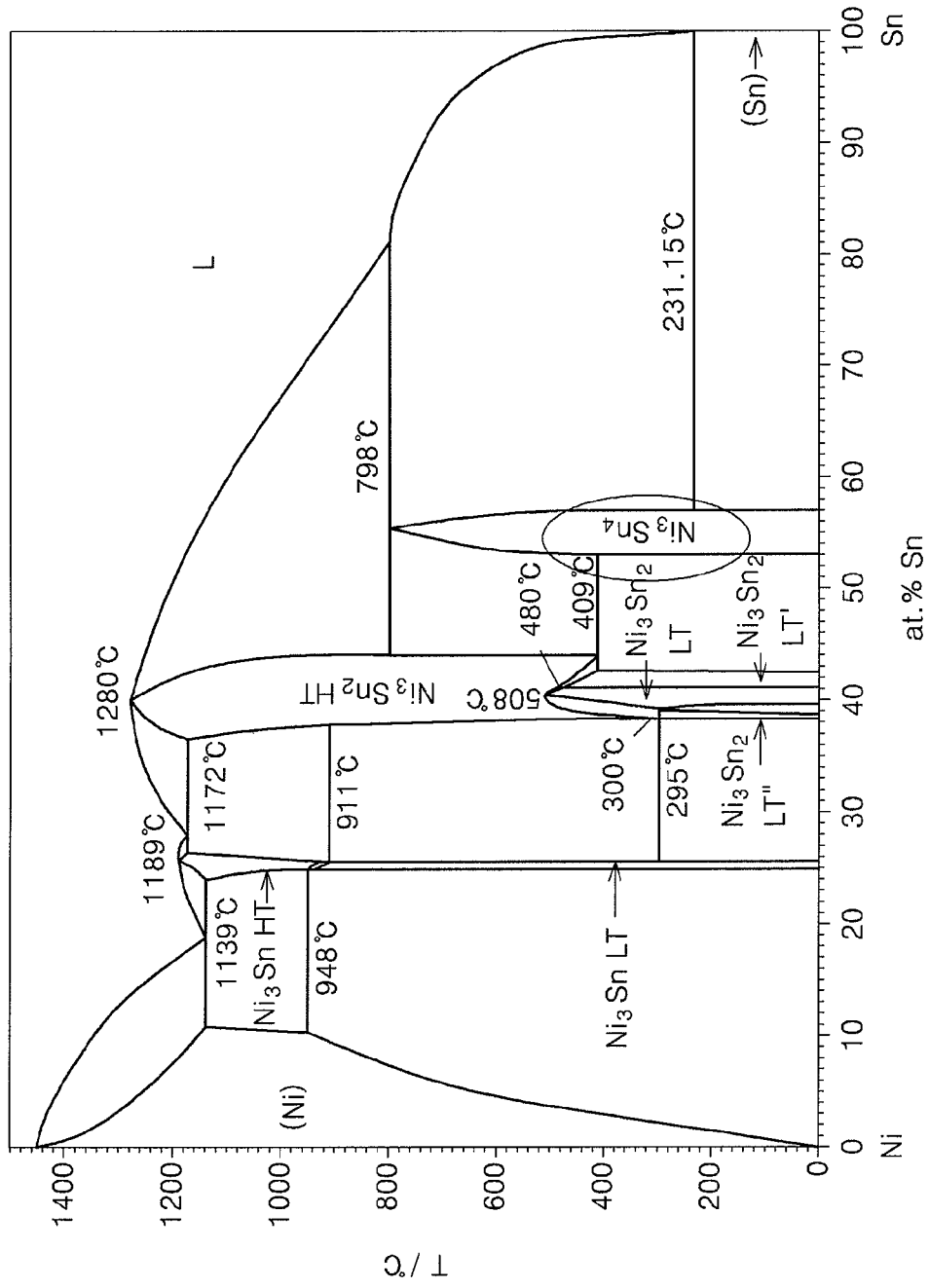
FIG. 1 is a diagram for showing an alloying ratio of nickel (Ni) and tin (Sn), according to temperature.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Herein, when a first element is referred to as being formed or disposed "on" a second element, the first element can be disposed directly on the second element, or one or more other elements may be disposed therebetween. When a first element is referred to as being formed or disposed "directly on" a second element, no other elements are disposed therebetween. In addition, when a first element is described as being "connected to" a second element, the first element may be directly connected to the second element, or may be indirectly connected to the second element, via one or more intervening elements.

A negative electrode for a lithium battery, according to an exemplary embodiment of the present invention, includes a current collector and a negative active material layer disposed thereon. The current collector may include at least one selected from the group consisting of a copper foil, a nickel foil, a stainless steel foil, a titanium foil, a nickel foam, a copper form, and a polymeric substrate coated with a conductive metal, but is not limited thereto. Alternatively, the current collector may be manufactured from a mixture of the materials listed above, by stacking substrates made from the materials upon one another, or the like.

The negative active material includes a matrix layer including an M-tin (Sn) alloy grain and a Sn grain, and a carbon-based material. The carbon-based material is grown directly on the matrix, and 'M' is a metal that is not alloyed with lithium.

In this specification, the "M-Sn alloy grain" refers to a grain consisting of an alloy of a metal M and Sn and may refer to a plurality of such grains. In this specification, the "Sn grain" refers to a grain consisting of Sn and may refer to a plurality of such grains. In this specification, the "matrix" refers to a portion of the negative active material excluding the carbon-based material layer.

The matrix, including the M-Sn alloy grain and the Sn grain, reversibly intercalates lithium ions. Since the matrix has excellent discharge capacity properties, a negative electrode including the negative active material layer may be used in various applications, such as in large capacity batteries.

The matrix may further include an M grain. In this specification, the "M grain" refers to a grain including the metal M and may refer to a plurality of such grains.

M is a metal that is not alloyed with lithium. According to some aspects, M is a metal that generally does not form an alloy with lithium. For example, M includes at least one metal selected from the group consisting of iron (Fe), cobalt (Co), nickel (Ni), zinc (Zn), manganese (Mn), and bismuth (Bi). For example, M may be nickel (Ni). M may include a nickel steel alloy, such as Invar (Fe 52%, Co 42%, and Ni 6%) or the like.

An alloying ratio of M and Sn of the M-Sn alloy grain may vary according to a temperature range at which the matrix is formed (which is the same as a temperature range for growing the carbon-based material. For example, when M is Ni, an alloying ratio of Ni and Sn of a Ni—Sn alloy grain may vary according to temperature, as shown in FIG. 1.

In FIG. 1, "L" is a region where Ni and Sn exist in a liquid state, "HT" is an acronym for "high temperature", and "LT" is an acronym for "low temperature". Referring to FIG. 1, $Ni_3Sn_2$ and $Ni_3Sn_4$ may be formed at a temperature in the range of about 500° C. to about 700° C. Whether $Ni_3Sn_2$ or $Ni_3Sn_4$ is formed may be determined according to a ratio of Ni and Sn in a plating layer.

The carbon-based material is grown directly on the matrix. That is, the carbon-based material is grown directly on the matrix, rather than coating a previously formed carbon-based material on the matrix.

In this specification, the expression "the carbon-based material is grown directly on the matrix" refers to the carbon-based material being grown directly on the surface of matrix, and/or in the matrix. For example, a composite of the M-Sn alloy grain, the Sn grain, and the carbon-based material may form the negative active material layer. The composite may be observed by an electron microscope, or the like.

The carbon-based material relieves and/or substantially prevents volumetric expansions that may occur during the repeated intercalation and de-intercalation of lithium ions in the matrix. The matrix may include the M-Sn alloy grain and the Sn grain. The matrix may also optionally include an M grain. Thus, the separation of the negative active material layer from the current collector and/or the breakdown of the negative active material layer, due to the deformation of the matrix by lithium ions, may be substantially prevented. The carbon-based material may increase the conductivity of the negative active material layer. Thus, a lithium battery including the above-described negative electrode may have excellent cycle-life and reliability.

The carbon-based material may include any structure formed by providing a carbon source, such as a carbon-containing gas, to a metal catalyst (which may be element M of a plating layer including M and Sn). For example, the carbon-based material may be at least one selected from the group consisting of carbon nanotubes, a graphite-analog, carbon nanohorns, and carbon nanofibers, but is not limited thereto. For example, the carbon-based material may be carbon nanotubes.

When the negative active material layer includes an M grain, the M grain may be contained in the matrix, or disposed on the surface of the matrix. The M grain may be attached to the carbon-based material. For example, when the carbon-based material is carbon nanotubes, the M grain may be attached to tips of the carbon nanotubes. The M grain attached to the carbon-based material may be used as a catalyst for growing the carbon-based material, which will be described in more detail with reference to a method of manufacturing the negative electrode.

The method of manufacturing the negative electrode may include: forming, on a current collector, a plating layer including a metal M and Sn; and converting the plating layer into a matrix including an M-Sn alloy grain and a Sn grain, while simultaneously growing a carbon-based material on the matrix, to form a negative active material layer. The carbon-based material may be grown by providing a carbon source to the plating layer, under a high temperature atmosphere.

First, the plating layer including M (which is not alloyed with lithium) and Sn is formed on the current collector. The surface roughness of the plating layer may be in the range of about RMS 1000 Å to about RMS 10000 Å, for example, about RMS 2000 Å to about RMS 9000 Å. M may operate as a catalyst for directly growing a carbon-based material and may be positioned not only on the surface of the plating layer, but also may be disposed within in the plating layer. Thus, the carbon-based material may be disposed on the matrix and/or in the matrix. Thus, even if the negative active material layer is partially separated from the current collector, due to volume changes that may occur during charging and discharging of the negative electrode, a conductive path may be maintained, thereby improving the lifetime of a battery.

A method of forming the plating layer, according to an exemplary embodiment of the present invention, may include: preparing a current collector and a plating solution; and forming the plating layer on the current collector, by dipping the current collector in the plating solution. The current collector is described in more detail above.

The plating solution may include an M-containing compound and a Sn-containing compound. The Sn-containing compound may be, for example, a sulfate, carbonate, nitrate, and/or halide (e.g., fluoride and chloride) of Sn, but is not limited thereto. The M-containing compound may be, for example, a sulfate, carbonate, nitrate and/or halide (e.g., fluoride and chloride) of Sn, but is not limited thereto. For example, the M-containing compound may be $NiCl_2.6H_2O$, and the Sn-containing compound may be $SnCl_2.2H_2O$, but the present disclosure is not limited thereto. The plating solution may further include a sulfuric acid, and various free acids, but is not limited thereto.

The plating solution may further include a solvent, in addition to the M-containing compound and the Sn-compound compound. The solvent may be, for example, water, but is not limited thereto. The concentration of the M-containing compound and the Sn-containing compound in the plating solution may vary and may be determined in consideration of the desired thickness and surface roughness of the plating layer.

The plating layer including M and Sn may be formed on the current collector by dipping the current collector in the plating solution prepared as described above. During the plating, a side of the current collector is connected to a plating electrode, and another side of the current collector is connected to a plated electrode. A current supplied through the plating electrode and the plated electrode may vary according to the concentrations of the M-containing compound and the Sn-containing compound of the plating solution. For example, the current may be in the range of about 1 A/dm² to about 10 A/dm², for example, about 2 A/dm² to about 4 A/dm².

During the plating, the temperature of the plating solution may vary, according to the concentrations of the M-containing compound and the Sn-containing compound. For example, the temperature may be in the range of about 20° C. to about 40° C. A plating time may vary, according to the concentrations of the M-containing compound and the Sn-containing compound. For example, the plating time may be in the range of about 0.5 minutes to about 5 minutes, for example, about 0.5 minutes to about 2 minutes. An interval between the plating electrode and the plated electrode may vary, according to the concentrations of the M-containing compound and the Sn-containing compound. For example, the interval may be selected from about 1 cm to about 10 cm, for example, about 2 cm to about 5 cm.

Then, a carbon source is provided to the plating layer, under a high temperature atmosphere. Thus, the plating layer may be changed into a matrix including an M-Sn alloy grain and a Sn grain. Simultaneously, a carbon-based material may be grown directly on the matrix.

When a carbon source is provided to the plating layer under a high temperature atmosphere, a portion of the M and Sn of the plating layer may form the M-Sn alloy grain, and another portion of the M and Sn may form the M-Sn ally grain, after operating as a catalyst for growing the carbon-based material. Another portion of the M of the plating layer may operate as a catalyst for growing the carbon-based material, and then may be attached to the carbon-based material. Thus, an M grain may be attached to the carbon-based material. For example, when the carbon-based material is carbon nanotubes, the M grain may exist on tips of the carbon nanotubes.

As a result, the negative active material layer may be formed. The negative active material layer includes a matrix including the M-Sn alloy grain and the Sn grain, and a carbon-based material that is grown directly on the matrix. As would be apparent to one of skill in the art, the matrix may include a plurality of the M-Sn alloy and Sn grains.

The temperature of the high temperature atmosphere may be determined in such a way that a matrix including the M-Sn alloy grain and the Sn grain is formed from the plating layer, and the carbon-based material is grown directly on the matrix. For example, the temperature may be in the range of about 500° C. to about 700° C., for example, about 550° C. to about 650° C., but is not limited thereto. The high temperature atmosphere may be determined according to the type of M contained in the plating layer, a ratio of M to Sn in the plating layer, and the flow rate and type of the carbon source.

The carbon source is a material that provides carbon for growing the carbon-based material. The carbon source may be, for example, CO, $C_2H_2$, and $CH_4$, but is not limited thereto.

In addition to the carbon source, a gas such as $H_2$, $N_2$, and $H_2O$ may be further provided. The gas may operate a buffer and/or facilitate a decomposition reaction of the carbon source.

A period of time for forming the matrix and/or growing the carbon-based material may vary, according to the type of M contained in the plating layer, a ratio of M and Sn of the plating layer, and the type/flow rate of the carbon source. For example, the period of time may be in the range of about 5 minutes to about 30 minutes.

Since the high temperature atmosphere and the carbon source are provided after the plating layer is formed, the formation of the matrix and the growth of the carbon-based material may be simultaneously performed. Thus, the negative electrode may be very easily formed, as described above.

The negative electrode may be used in a lithium battery. For example, the lithium battery may include the negative electrode, a positive electrode, and an electrolyte.

The positive electrode may include a current collector and a positive active material layer formed on the current collector. A compound (lithiated intercalation compound) that reversibly intercalates lithium may be used as the positive active material. In particular, the positive active material may be a composite oxide of lithium and a metal selected from the group consisting of cobalt, manganese, nickel, and combinations thereof.

Examples of the positive active material may include compounds represented by the following formulae: $Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $LiE_{2-b}X_bO_{4-c}D_c$ (where $0 \leq b \leq 0.5$ and $0 \leq x \leq 0.05$); $Li_aNi_{1-b-c}Co_bB_cD_\alpha$ (where $0.95 \leq a \leq 1.1$, $0 \leq 0.5$, $0 \leq c \leq 0.05$, and $0 < \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (where $0.955 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aN_{ib}E_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_bMn_dG_eO_2$ (where $0.90 \leq a \leq 1.1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.1$ and $0.001 \leq b \leq 0.1$); $Li_aCoG_bO_2$ (where $0.90 \leq a \leq 1.1$ and $0.001 \leq b \leq 0.1$); $Li_aMnG_bO_2$ (where $0.90 \leq a \leq 1.1$ and $0.001 \leq b \leq 0.1$); $Li_aMn_2G_bO_4$ (where $0.90 \leq a \leq 1.1$ and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above: A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof, but is not limited thereto.

The positive electrode may include a surface coating (hereinafter, "coating layer") disposed on the positive active material. Alternatively, a mixture of an uncoated positive active material and a coated positive active material may be used. The coating layer may include at least one coating element. The coating element may be in the form of an oxide, hydroxide, oxyhydroxide, oxycarbonate, and hydroxycarbonate. The coating element may be amorphous or crystalline. The coating element may be magnesium (Mg), aluminium (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or combinations thereof.

The coating layer may be formed using any method, for example, a spray coating method, a dipping method, or the like, which does not adversely affect the physical properties of the positive active material, when a compound of such a coating element is used. This is obvious to those of ordinary skill in the art, and thus, a detailed description thereof will not be provided.

The positive active material layer may further include a binder and a conducting agent. The binder operates to strongly bind particles of the positive active material to one another and to a current collector. Examples of the binder may include, but be not limited to, polymers, including polyvinyl alcohol, carboxymethyl cellulose, hydroxypropyl cellulose, diacetyl cellulose, polyvinyl chloride, carboxylated polyvinyl chloride, polyvinyl fluoride, and ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, nylon, and the like.

The conducting agent increases the conductivity of the positive electrode. Any suitable electronic conductive material may be used. Examples of the conducting agent include carbonaceous materials, such as natural graphite, artificial graphite, carbon black, acetylene black, ketchen black, carbon fibers, and the like; metal-based materials, such as copper, nickel, aluminum, silver, and the like, in powder or fiber form; and conductive materials, including conductive polymers, such as a polyphenylene derivative, and a mixture thereof.

Al may be used as the current collector, but the present embodiment is not limited thereto. The positive electrode may be manufactured by mixing the positive active material, the conducting agent, and the binder in a solvent, to prepare a positive active material composition. The composition is then coated on the current collector. The method of preparing the positive electrode is obvious to those of ordinary skill in the art, and thus a detailed description thereof will not be provided. N-methylpyrrolidione may be used as the solvent, but is not limited thereto.

A half cell may be formed using a lithium electrode as the positive electrode. The electrolyte may include a nonaqueous organic solvent and a lithium salt. The nonaqueous organic solvent serves as a medium for the transfer of ions involved in electrochemical reactions in batteries.

Examples of the nonaqueous organic solvent may include carbonates, esters, ethers, alcohols, ketones and non-protonic solvents. Examples of the carbonates available as the nonaqueous organic solvent may include dimethyl carbonate (DMC), diethyl carbonate (DEC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), ethyl methyl carbonate (EMC), and the like. Examples of the ester-based solvents may include methyl acetate, ethyl acetate, n-propyl acetate, dimethyl acetate, methyl propionate, ethyl propionate, γ-butyrrolactone, decanolide, valerolactone, mevalonolactone, and caprolactone. Examples of the ethers available as the nonaqueous organic solvent may include dibutyl ether, tetraglyme, diglyme, dimethoxyethane, 2-methyltetrahydrofuran, tetrahydrofuran, and the like. Examples of the ketones available as the nonaqueous organic solvent may include cyclohexanone and the like. Examples of the alcohols available as the nonaqueous organic solvent may include ethyl alcohol, isopropyl alcohol, and the like. Examples of the non-protonic solvents may include nitrils, such as R—CN (where R is a straight, branched or cyclic C2-C20 hydrocarbon group, which may have a double-bonded aromatic ring or an ether bond); amides, such as dimethylformamide; dioxolanes, such as 1,3-dioxolane; sulfolanes, and the like.

The nonaqueous organic solvent may be used alone. Alternatively, at least two of the nonaqueous organic solvents may be used in combination. In this case, a mixing ratio of the at least two of the nonaqueous organic solvents may appropriately vary, according to the performance of the battery, which will be obvious to those of skill in the art.

The lithium salt is dissolved in the organic solvent and operates as a source of lithium ions in the battery, thereby enabling the basic operation of the battery. In addition, the lithium salt facilitates the migration of lithium ions between the negative and positive electrodes. Examples of the lithium salt may include at least one supporting electrolyte salt selected from the group consisting of $LiPF_6$, $LiBF_4$, $LiSbF_6$, $LiAsF_6$, $LiN(SO_2C_2F_6)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$(LiBOB; lithium bis(oxalato) borate). The concentration of the lithium salt may be in a range of about 0.1 to about 2.0 M. If the concentration of the lithium salt is within the above range, the electrolyte may have an appropriate conductivity and viscosity and thus, allowing lithium ions to effectively migrate.

A separator may be disposed between the positive electrode and the negative electrode, according to the type of the lithium battery. The separator may include one or more layers of polyethylene, polypropylene, polyvinylidene fluoride, or a combination thereof. For example, the separator may be a two-layered separator including polyethylene and polypropylene layers, a three-layered separator including polyethylene, polypropylene and polyethylene layers, or a three-layered separator including polypropylene, polyethylene and polypropylene layers, for example.

Lithium batteries may be classified as lithium ion batteries, lithium ion polymer batteries, or lithium polymer batteries, according to the type separator and/or electrolyte included therein. In addition, lithium batteries may be classified as cylindrical, rectangular, coin-type, or a pouch-type, according to the shape thereof. Lithium batteries may be classified as bulk-type and a thin-film type, according to the size thereof. In addition, lithium batteries may be used as both primary batteries and secondary batteries. A method of manufacturing a lithium battery is widely known in the field, so a detailed description thereof will not recited herein.

Figure 2:
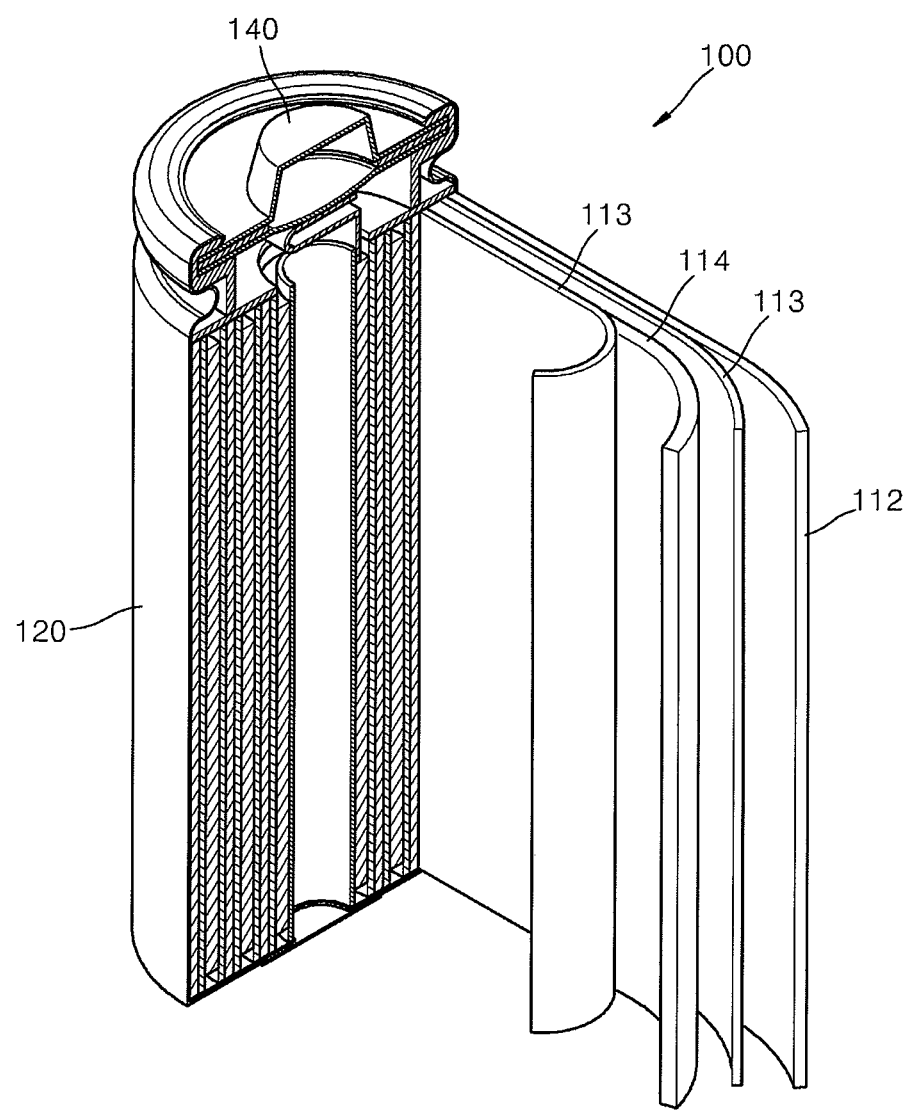
FIG. 2 is a schematic view of a lithium battery, according to an exemplary embodiment of the present invention.

FIG. 2 is a schematic view for explaining a lithium battery 100, according to an exemplary embodiment of the present invention. Referring to FIG. 2, the lithium battery 100 includes a positive electrode 114, a negative electrode 112, a separator 113 interposed therebetween, an electrolyte (not shown) impregnated into the electrodes 114, 112 and the separator 113, a battery case 120, and a sealing member 140 to seal the case 120. The lithium battery 100 is manufactured by sequentially stacking the positive electrode 114, the negative electrode 112, and the separator 113 upon one another, winding the stack in a spiral form, and accommodating the wound stack in the case 140.

Hereinafter, one or more exemplary embodiments of the present invention will be described in detail with reference to the following examples. However, these examples are not intended to limit the purpose and scope of the present invention.

Example 1

Formation of Plating Layer Including Ni and Sn

A Cu current collector was prepared by removing a surface oxide layer from a Cu foil with a size of 0.25 dm$^2$, using 5 volume % of a $H_2SO_4$ aqueous solution, and then washing the Cu foil in an alkali aqueous solution and deionized water. A plating bath containing 50 g/L of $SnCl_2.2H_2O$ and 250 g/L of $NiCl_2.6H_2O$ 250 g/L as a plating solution was prepared. A plating layer including Ni and Sn, having a thickness of 10 μm, was formed on the Cu current collector, by preparing a Sn electrode as a plating electrode and the Cu foil as a plated electrode. The temperature of the plating solution was adjusted to about 40° C. and electroplating was performed in the plating solution, while the electrolyte solution was stirred by a current of 5 A/dm$_2$, for 0.5 minutes.

Figure 3:
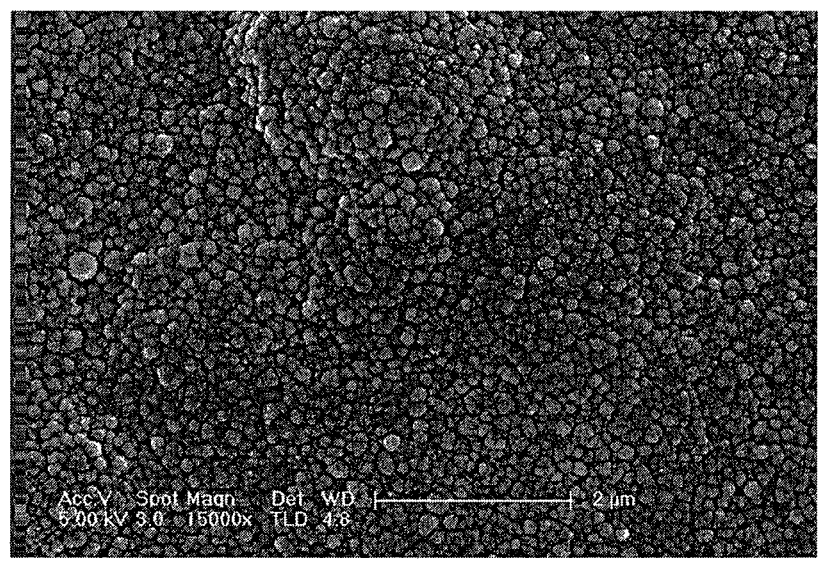
FIG. 3 is a scanning electron microscopic (SEM) image illustrating the surface of a plating layer prepared in Example 1.

FIG. 3 is a scanning electron microscopic (SEM) image illustrating the surface of the plating layer including Ni and Sn. The surface roughness of the plating layer was evaluated using an atomic force microscopy (AFM), and determined to be a surface roughness of about RMS 5000 Å.

Formation of Matrix and Growth of Carbon Nanotube

An active material layer was prepared by installing a current collector including the plating layer in a chamber, under a nitrogen atmosphere, increasing a temperature of the inside of the chamber to 550° C., and then converting the plating layer into a matrix including an Ni—Sn alloy grain and a Sn grain. At the same time, carbon nanotubes were grown directly on the matrix, by supplying $C_2H_2$ gas (flow rate: 1.0 slm) and $N_2$ gas (flow rate: 1.5 slm) into the chamber, for ten minutes, while the temperature was maintained. Accordingly, an active material layer including the matrix including the Ni—Sn alloy and Sn grains, and the carbon nanotubes grown thereon, was formed.

Figure 4A:
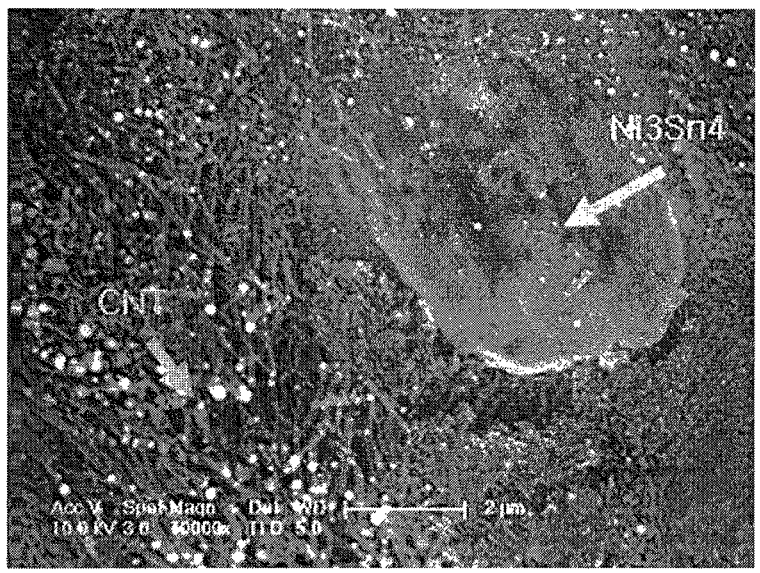
FIGS. 4A and 4B are SEM images illustrating regions of the surface of an active material layer formed in Example 1.
Figure 4B:
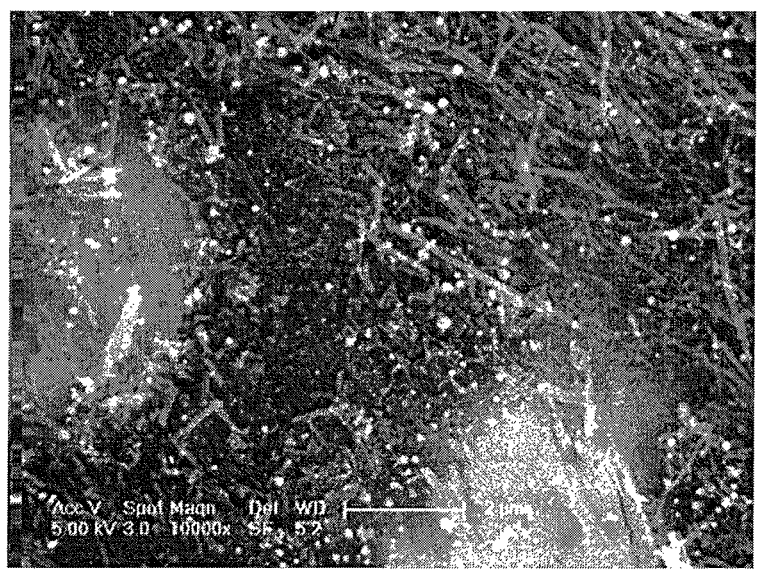

FIGS. 4A and 4B are SEM images illustrating regions of the surface of the active material layer formed in Example 1. As shown in FIGS. 4A and 4B, it may be seen that carbon nanotubes were disposed on the surface of the active material layer.

In order to check components of the active material layer, an X-ray diffraction analysis (XRD analysis) was performed on the current collector and the active material layer, using an X'Pert ProMPD (Phillips). In the XRD analysis, a scanning range was about 10 to about 80 degrees, and a scanning speed was 0.02 degrees per second.

Figure 5:
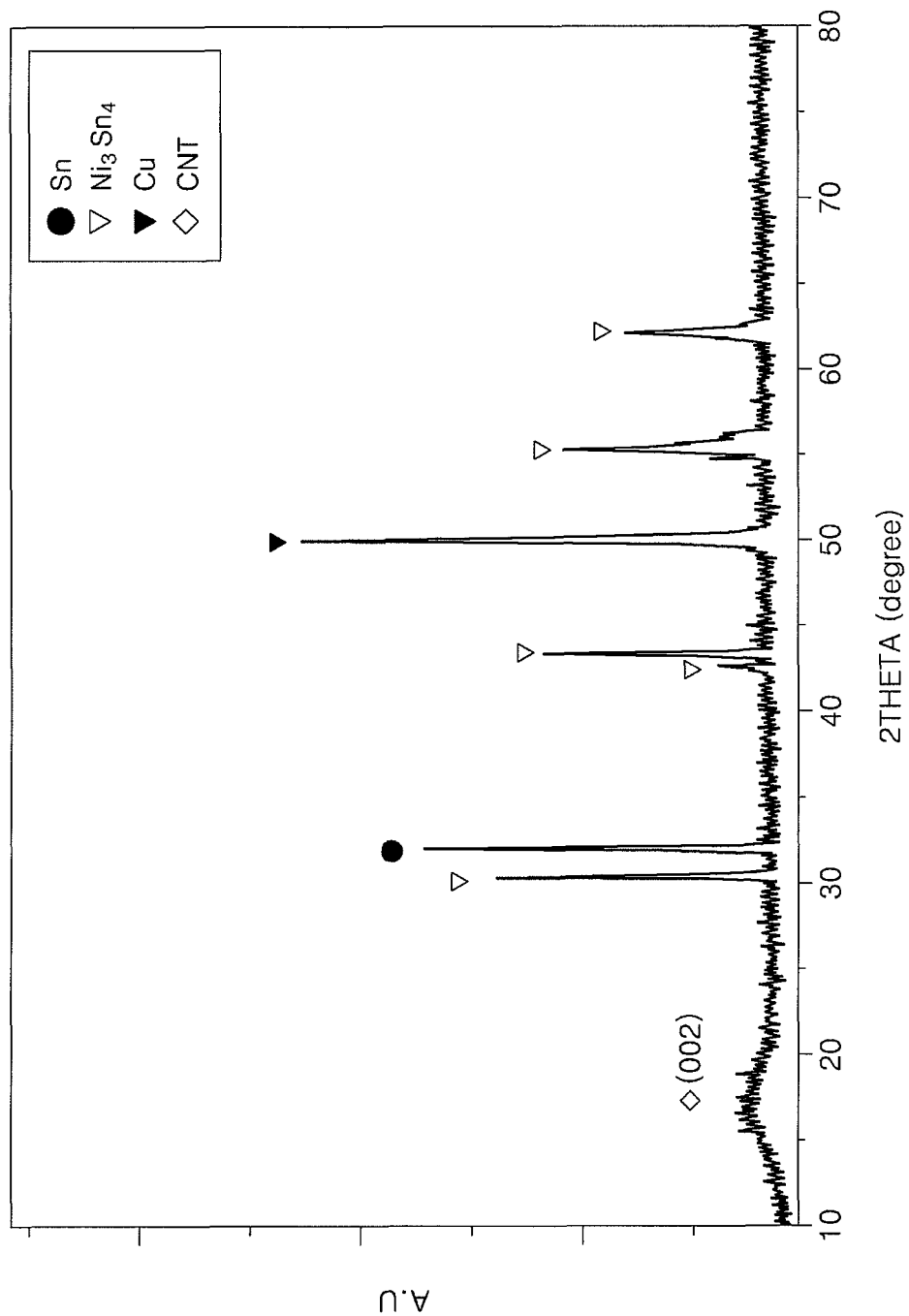
FIG. 5 shows the results of an XRD analysis of a negative electrode prepared in Example 1.

FIG. 5 (where the y axis indicates an intensity (a.u.)) shows the results of the XRD analysis. As shown in FIG. 5, a Sn peak, a $Ni_3Sn_4$ peak, a Cu peak, and a carbon nanotube peak were observed. The Cu peak was derived from the current collector. Thus, it may be seen that the active material layer includes a Sn grain, a $Ni_3Sn_4$ grain, and carbon nanotubes.

Comparative Example 1

A plating layer was prepared by the method of Example 1, except that the matrix and carbon nanotubes were not formed.

Comparative Example 2

An active material layer was prepared in the same manner as in Example 1, except that the $C_2H_2$ gas and the $N_2$ gas were not provided. Thus the carbon nanotubes were not grown.

Evaluation Example

1) Manufacture of Battery

In order to evaluate the electrochemical properties of the negative electrodes prepared in Example 1, and Comparative Examples 1 and 2, batteries including the same were manufactured. In each battery, the electrodes prepared in Example 1, and Comparative Examples 1 and 2 were used as a negative electrode, and a lithium electrode was used as a positive electrode. A coin cell battery was prepared by winding and compressing the electrodes around a separator formed of polyethylene, having a thickness of 20 μm, and then injecting an electrolyte. The electrolyte was prepared by dissolving $LiPF_6$ in a mixture solvent including ethylene carbonate (EC), ethyl methyl carbonate (EMC) and diethyl carbonate (DEC) (volumetric ratio of EC:EMC:DEC=3:5:2), so as to have a concentration of 1.15M.

2) Evaluation of Initial Capacity

The initial capacities of batteries including the negative electrodes prepared in Example 1 and Comparative Examples 1 and 2 were evaluated, and the results are shown in Table 1. The batteries according to Example 1, and Comparative Examples 1 and 2 were subjected to one cycle of charging at a constant current cc/a constant voltage (CV) of 0.01 V and a charge/discharge rate of 0.2 C, under a cut-off current of 0.01 C, and a discharging at a charge/discharge rate of 0.2 C, under a cut-off voltage of 1.1 V. Then, the initial capacities of the batteries were measured and evaluated.

3) Evaluation of Cycle Lifetime Properties

The above cycle was performed 50 times on the negative electrodes prepared in Example 1, and Comparative Examples 1 and 2, and then the capacities of the batteries were evaluated. The results were shown in Table 1 and FIG. 6. The cycle lifetime properties of the batteries were evaluated by calculating (capacity after 50 cycles/Initial capacity)×100(%) of each of the batteries.

TABLE 1

| | Initial capacity (mAh/g) | Capacity after 50 cycles (mAh/g) | Capacity maintenance (%) |
|---|---|---|---|
| Battery including negative electrode of Example 1 | 620 | 510 | 82 |
| Battery including negative electrode of Comparative Example 1 | 751 | 301 | 40 |
| Battery including negative electrode of Comparative Example 2 | 650 | 346 | 53 |

Figure 6:
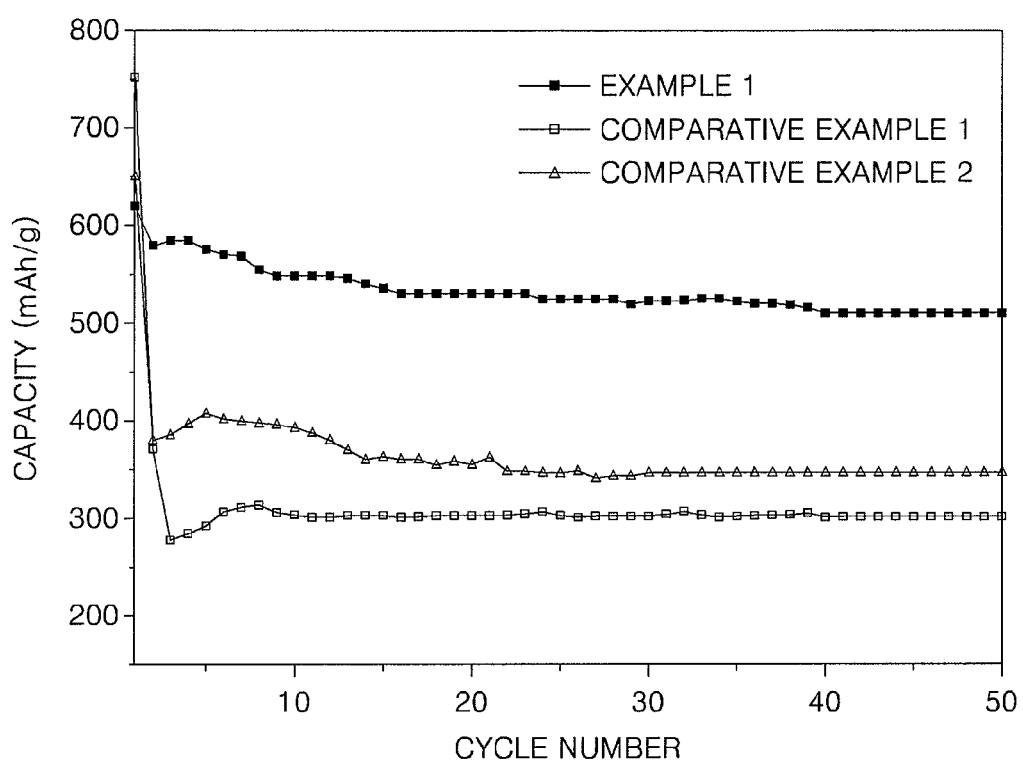
FIG. 6 is a graph of the capacities of batteries including negative electrodes prepared in Example 1, and Comparative Examples 1 and 2, with respect to the number of cycles.

As shown in Table 1 and FIG. 6, it may be seen a battery including the negative electrode prepared in Example 1 has excellent cycle lifetime properties, as compared to batteries including the negative electrodes prepared in Comparative Examples of 1 and 2.

As described above, according to the one or more of the above embodiments of the present invention, a lithium battery including a negative electrode may have excellent capacity and cycle life.

It should be understood that the exemplary embodiments described therein should be considered in a descriptive sense only and not for purposes of limitation. Descriptions of features or aspects within each exemplary embodiment should typically be considered as available for other similar features or aspects in other embodiments.

Although a few embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A method of manufacturing a negative electrode for a lithium battery, the method comprising:
    forming a plating layer, including Sn and a metal M that is not alloyed with lithium, on a current collector; and
    forming a negative active material layer, by converting the plating layer into a matrix including an M-Sn alloy grain and a Sn grain, while simultaneously growing a carbon-based material directly on the matrix, by providing a carbon source to the plating layer, under a high temperature atmosphere.

2. The method of claim 1, wherein surface roughness of the plating layer is in the range of about RMS 1000 Å to about RMS 10000 Å.

3. The method of claim 1, wherein the temperature of the high temperature atmosphere is in the range of about 500° C. to about 700° C.

4. The method of claim 1, wherein the carbon source is at least one selected from the group consisting of CO, $C_2H_2$, and $CH_4$.

* * * * *